United States Patent Office 3,766,269
Patented Oct. 16, 1973

3,766,269
OXY-BIS-(N-ALKYLAMIDES) AND THEIR USE
AS SLIP ADDITIVES
Richard James Powell, Orange, Tex., assignor to E. I. du
Pont de Nemours and Company, Wilmington, Del.
No Drawing. Filed May 11, 1971, Ser. No. 142,335
Int. Cl. C07c 103/30
U.S. Cl. 260—561 B          5 Claims

ABSTRACT OF THE DISCLOSURE

Oxy-bis-(N-alkylamides) having the formula

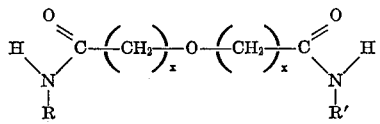

wherein $x$ is 1 or 2, R is an alkyl group of 4 to 22 carbon atoms and R' is an alkyl group of 4 to 22 carbon atoms and compositions comprising (A) polyethylene, polypropylene, copolymers of ethylene and alpha-olefins of more than 2 carbon atoms, copolymers of propylene and alpha-olefins of more than 3 carbon atoms, copolymers of ethylene and vinyl acetate containing up to about 12 percent by weight vinyl acetate polymerized units or mixtures thereof, and (B) 300 to 20,000 p.p.m. by weight of any oxy-bis-(N-alkylamide).

---

This invention relates to oxy-bis-(N-alkylamides). Particularly this invention relates to film-forming, carbon chain saturated polymers containing oxy-bis-(N-alkylamides).

When a roll of plastic film is unwound or sheets of film are fed from a stack of such sheets, it is desirable that there be little cohesion of the film to an adjacent layer thereof. One measure of this cohesion is called block, which is a measure of the force required to peel one sheet of plastic film from another. Another measure of this cohesion is called slip, which is a measure of the force required to draw one sheet of plastic film across another sheet thereof. Generally, a low value for slip and for block means that a low force is required in each of these tests and therefore that the cohesion is also low. The use of additives in film resin compositions for the purpose of improving the slip and block properties of the resultant film is known. Additives which have been utilized in polyethylene include oleamide, erucamide, N,N'-dialphatic thiodipropionamide, and stearamide. However, there is still a need for improved slip and antiblock additives for polyethylene and for other film-forming plastics.

A composition has been found which when incorporated into a film-forming resin yields a resin which produces a film with improved slip and block properties. The composition is oxy-bis(N-alkylamide), having the formula

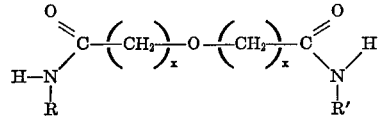

wherein $x$ is 1 or 2, R is an alkyl group of 4 to 22 carbon atoms and R' is an alkyl group of 4 to 22 carbon atoms.

When the composition above is incorporated in a film-forming resin, a mixture results which comprises (A) a polymer selected from the class consisting of polyethylene, polypropylene, copolymers of ethylene and alpha-olefins of more than two carbon atoms, copolymers of propylene and alpha-olefins of more than three carbon atoms, copolymers of ethylene and vinyl acetate containing up to about 12 percent by weight polymerized vinyl acetate units, and mixtures thereof and (B) 300 to 20,000 p.p.m. by weight of

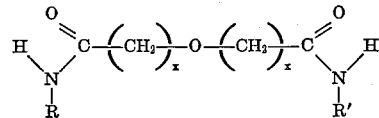

wherein $x$ is 1 or 2, R is an alkyl group of 4 to 22 carbon atoms, and R' is an alkyl group of 4 to 22 carbon atoms.

In the oxy-bis-(N-alkylamides), $x$ is preferably 1 while R and R' are preferably 8 to 22 carbon atoms. R and R' can be either saturated or unsaturated alkyl groups but the unsaturated alkyl groups are preferred. The R and R'′s which are preferred are oleyl, octyl, erucyl, and combinations which R is oleyl and R' is stearyl and R is erucyl and R' is behenyl.

The preferred concentration of the slip additive in the film-forming polymers is 500 to 2000 p.p.m. by weight. The exact amount of the additive to be used will depend on the particular additive to be employed, the particular polymer in which it is utilized, and the results desired therefrom.

The film-forming polymers in which the additives of the present invention are used include linear and branched polyethylene, polypropylene, copolymers of ethylene and alpha-olefins of more than two carbon atoms such as propylene, copolymers of ethylene and vinyl acetate containing up to about 12 percent by weight vinyl acetate polymerized units, copolymers of propylene and alpha-olefins of more than three carbon atoms, and mixtures of the above. The slip additives of the present invention can also be utilized in ethylene/methacrylic or acrylic acid copolymers or ionomers thereof.

Other of the conventional compounding additives can be present in the mixture of the film-forming resin and the slip additive, such as release agents, antioxidants, antistatic and other stabilizers. Also, from 500 to 5000 p.p.m of finely-divided silica can be used together with the oxy-bis-(N-alkylamides) to increase the effectiveness of the additive in highly glossy films, i.e., films with a gloss greater than 80.

The oxy-bis-(N-alkylamides) of the present invention are prepared by direct reaction of the appropriate oxy acid such as oxydiacetic acid and appropriate amine.

The oxy-bis-(N-alkylamides) additives of the present invention can be incorporated into the film-forming composition by conventional methods such as by injecting the additive into an extruder as a melt or in a solution or dry blending the polymer granules with the additive and then extruding the blend. Also, a concentrate of the additive in a polymer can be formed and then added to the remainder of the resin via an extruder. Other mixing equipment can be used such as a Banbury Mixer or a roll mill.

The resulting mixture can be subjected to any of the conventional film-forming processes such as blowing, chill rolling, or water bath to form films which are useful for wrapping, etc. and which exhibit improved slip and blocking properties, generally without sacrificing the visual characteristics of the film as measured by gloss and haze.

The following examples are meant to illustrate but not limit the invention. All parts and percentages are by weight unless otherwise specified. In the examples, the slip coefficient is determined substantially according to ASTM D–1894–63-Procedure B by using the following procedure: A film-covered metal object, i.e., boat (1.750″ diameter), is pulled over a smooth stationary film surface. The metal boat which is pulled over the stationary surface is pulled at a constant rate (20″/min.) by string running over a strain cell. The static and kinetic forces required to move the boat are registered on a recorder. The coefficient of friction is calculated by dividing the forces parallel to the direction of motion by that perpendicular to the direction of motion. A set of weights for the boat is used which will provide a range of total weight perpendicular to the direction of motion of 0.34 pound to 2.14 pounds.

In the examples natural block of blown film is the tendency for the inner surfaces of the collapsed film bubble to stick together. The procedure for the test is as follows: A test specimen is carefully cut from the roll of blown film as a 2" x 4" piece which has two layers. A tab on one layer is clamped stationary and a tab on the opposite end of the other layer is hooked to a string attached to a strain cell. The two layers of film are separated in the direction of the slip, i.e., parallel to the film surface. The force in pounds required to separate the two film layers at a constant rate is read from a recorder in pounds. This value is the force in pounds required to separate a surface of 8 square inches.

In the examples, gloss is measured according to ASTM–D523 62–T using a Gardener Gloss Meter and a 20° gloss head. Haze is measured according to ASTM–D–1003–61-Procedure A using a Gardener Haze Meter. Melt index is determined according to ASTM D–1238.

Example I

A mixture of 13.4 g. of diglycolic acid (oxy-bis-acetic acid) and 37 g. of laurylamine (molar ratio 1:2) was placed in a 500 ml. beaker and heated to above the melting point. As the temperature was increased, water was evolved as a vapor. The temperature of the mixture was maintained at about 175° C. for 30 minutes. The mixture was stirred occasionally during the heating period. Gradually the amount of water vapor evolving decreased, and the mixture began to smoke slightly and to color. At this point heating was discontinued. The mixture was stirred while cooling and formed a crystalline material. No attempt at recrystallization was made. The yield of oxy-bis-(N-laurylacetamide) based on complete reaction of the starting materials was about 80 percent.

Example II

A copolymer of ethylene and vinyl acetate (5.5 weight percent) was dry blended with each of the additives shown in Table 1 that there was 1000 p.p.m. by weight of each of the additives present. The polymer-additive mixture was melt blended at about 190° C. in a 2" extruder having a length-to-diameter ratio of 20:1 and fitted with a mixing torpedo.

The polymer-additive blends were processed into a 1.25-mil blown film with a 2½" extruder having a length-to-diameter ratio of 20:1 and equipped with a 4" diameter die. The film was collapsed on passing through a nip roll maintained at 40 p.s.i. The melt temperature of the film was about 360° F. Table 1 indicates the various additives utilized and their respective melting points as well as valves for slip and block for each of the films containing these additives.

TABLE 1

| Additive | Additive melt pt., °F. | Slip, lb./lb. | Block, lb./8 in.² |
|---|---|---|---|
| None | | 1.50 | 3.36 |
| Oxy-bis-(N-butylacetamide) | | 0.24 | 3.54 |
| Oxy-bis-(N-octylacetamide) | 225 | 0.18 | 1.57 |
| Oxy-bis-(N-laurylacetamide) | 221 | 0.30 | 2.11 |
| Oxy-bis-(N-stearylacetamide) | 230 | 0.49 | 2.60 |
| Oxy-bis-(N-oleylacetamide) | 185 | 0.16 | 2.79 |
| Oxy-bis-(N-arachidyl behenyl-acetamide) | 228 | 1.43 | 3.10 |
| Oxy-bis-(N-erucylacetamide) | 187 | 0.15 | 1.91 |
| Oxy-bis-(N-octylpropionamide) | 255 | 0.32 | 1.76 |

Example III

The procedure of Example II was followed except that the polymer utilized was a copolymer of ethylene and vinyl acetate (3.8 weight percent) and the only additive utilized was oxy-bis-(N-oleylacetamide), the additive being present at 1000 p.p.m. by weight. The results of various physical property tests on the film are shown in Table 2.

TABLE 2

Physical property:
- Haze, percent _____ 3.8
- Gloss (20°) _____ 94
- Slip, lb./lb. _____ 0.10
- Block, lb./8 in.² _____ 2.17

Example IV

The film was prepared utilizing the same procedure and the same amount of additive and polymer as in Example II. The slip additive utilized was oxy-bis-(N-oleylacetamide). In this case, however, silica was also added to the blend before it was formed into a film. The amount of silica utilized is shown in Table 3. The results of slip and block tests on the film as a function of time and silica content are shown in Table 3.

TABLE 3

| Time after extrusion | Slip, lb./lb. | Block, lb./8 in.² |
|---|---|---|
| 870 p.p.m. silica | | |
| 15 minutes | 0.33 | >2.5 |
| 1.2 hours | 0.10 | >2.5 |
| 16 hours | 0.10 | >2.5 |
| 1,750 p.p.m. silica | | |
| 5 minutes | 0.52 | 1.43 |
| 45 minutes | 0.16 | |
| 2 hours | 0.15 | 1.30 |

Example V

Following the procedure of Example II, two films were prepared which were 1.25 mils thick. The first film was made from polyethylene which contained 1000 parts per million by weight oxy-bis-(N-oleylacetamide) and the second film was made from polyethylene which contained 1000 parts per million by weight oxy-bis-(N-oleylacetamide) and 550 parts per million by weight silica. Both films had a slip coefficient of less than 0.1 lb./lb. while the block value for both films was less than 0.1 lb./8 in.².

Example VI

Following the procedure of Example II, 1.25 mil blown films were made from a blend of ethylene/propylene (approximately 1–3 percent by weight) copolymer with a melt index of 1.5 g./10 min. and a density of 0.921 gm./cc. and the additives shown in Table 4. A 2" extruder with a 20:1 length-to-diameter ratio equipped with a 6" diameter die was utilized to extrude the film rather than the extruder described in Example II. The results of various tests on the films are also shown in Table 4.

TABLE 4

| Additive | Amount, p.p.m. by weight | Gloss (20°) | Haze, percent | Slip, lb./lb. | Block, lb./8 in.² |
|---|---|---|---|---|---|
| None | 0 | 16 | 11.5 | 0.99 | 0.91 |
| Oxy-bis-(N-octylacetamide) | 1,000 | 13 | 12 | 0.08 | 0.47 |
| Do | 1,000 | 14 | 12.1 | 0.08 | 0.46 |

Example VII

Following the procedure of Example II, a 1.25 mil blown film was prepared on a 1½" extruder which had a 16:1 length-to-diameter ratio and was equipped with a 4" diameter die. The film was prepared from an ethylene/propylene (approximately 1–3 percent by weight) copolymer with a melt index of 2.6 g./10 min. and a density of 0.921 gram/cc. which contained 1000 parts per million by weight oxy-bis-(N-octylpropionamide) The film had a gloss (20°) of 98, a haze of 4.3 percent, a slip of 0.36 lb./lb. and a block of 0.79 lb./8 in.².

Example VIII

Following the procedure of Example I, oxy-bis-(N-octylacetamide) was prepared from a mixture of 13.4 g. of diglycolic acid and 25.8 g. of octylamine (molar ratio of 1:2).

Example IX

Following the procedure of Example I, oxy-bis-(N-oleylacetamide) was prepared from a mixture of 13.4 g. of diglycolic acid and 50.3 g. of oleylamine (molar ratio of 1:2).

Example X

Following the procedure of Example I, an oxy-bis-(N-alkylacetamide) was prepared from a mixture of 13.4 g. of diglycolic acid, 25.3 g. of oleylamine, and 25.3 g. of stearylamine.

I claim:

1. A composition having the formula

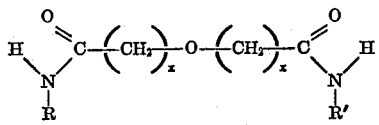

wherein $x$ is 1 or 2, R is an alkyl group of from 4 to 22 carbon atoms, and R' is an alkyl group of 4 to 22 carbon atoms.

2. The composition of claim 1 wherein $x$ is 1 and R is an alkyl group of 8 to 22 carbon atoms and R' is an alkyl group of 8 to 22 carbon atoms.

3. The composition of claim 2 wherein R is selected from the group consisting of oleyl, octyl and erucyl and R' is selected from the group consisting of oleyl, octyl and erucyl.

4. The composition of claim 1 wherein R is oleyl and R' is stearyl.

5. The composition of claim 1 wherein R is erucyl and R' is behenyl.

References Cited

UNITED STATES PATENTS

| | | | |
|---|---|---|---|
| 2,158,064 | 5/1939 | Carothers | 260—561 K X |
| 2,594,286 | 4/1952 | Bryant et al. | 260—561 K X |
| 3,320,315 | 5/1967 | Towle et al. | 260—561 K |

OTHER REFERENCES

Christian, Jr., et al., Journ. Amer. Chem. Soc., pp. 1333–6, vol. 70.

LEWIS GOTTS, Primary Examiner

E. G. LOVE, Assistant Examiner

U.S. Cl. X.R.

260—32.6, 561 K

PO-1050
(5/69)

UNITED STATES PATENT OFFICE
CERTIFICATE OF CORRECTION

Patent No. 3,766,269          Dated October 16, 1973

Inventor(s) Richard James Powell

It is certified that error appears in the above-identified patent and that said Letters Patent are hereby corrected as shown below:

Column 1, line 27, "any" should read -- an --.

Column 2, line 16, "which" should read -- where --.

Column 3, line 46, after "Table 1", insert -- such --.

Column 4, line 44, "0.1" should read -- 0.5 --.

Signed and sealed this 23rd day of April 1974.

(SEAL)
Attest:

EDWARD M.FLETCHER,JR.                C. MARSHALL DANN
Attesting Officer                    Commissioner of Patents